March 14, 1933. J. A. MORITZ 1,901,464
METHOD OF INSULATING ZINC SPELTER BATHS AND
MEANS FOR EFFECTING THEIR PRACTICE
Filed April 23, 1931
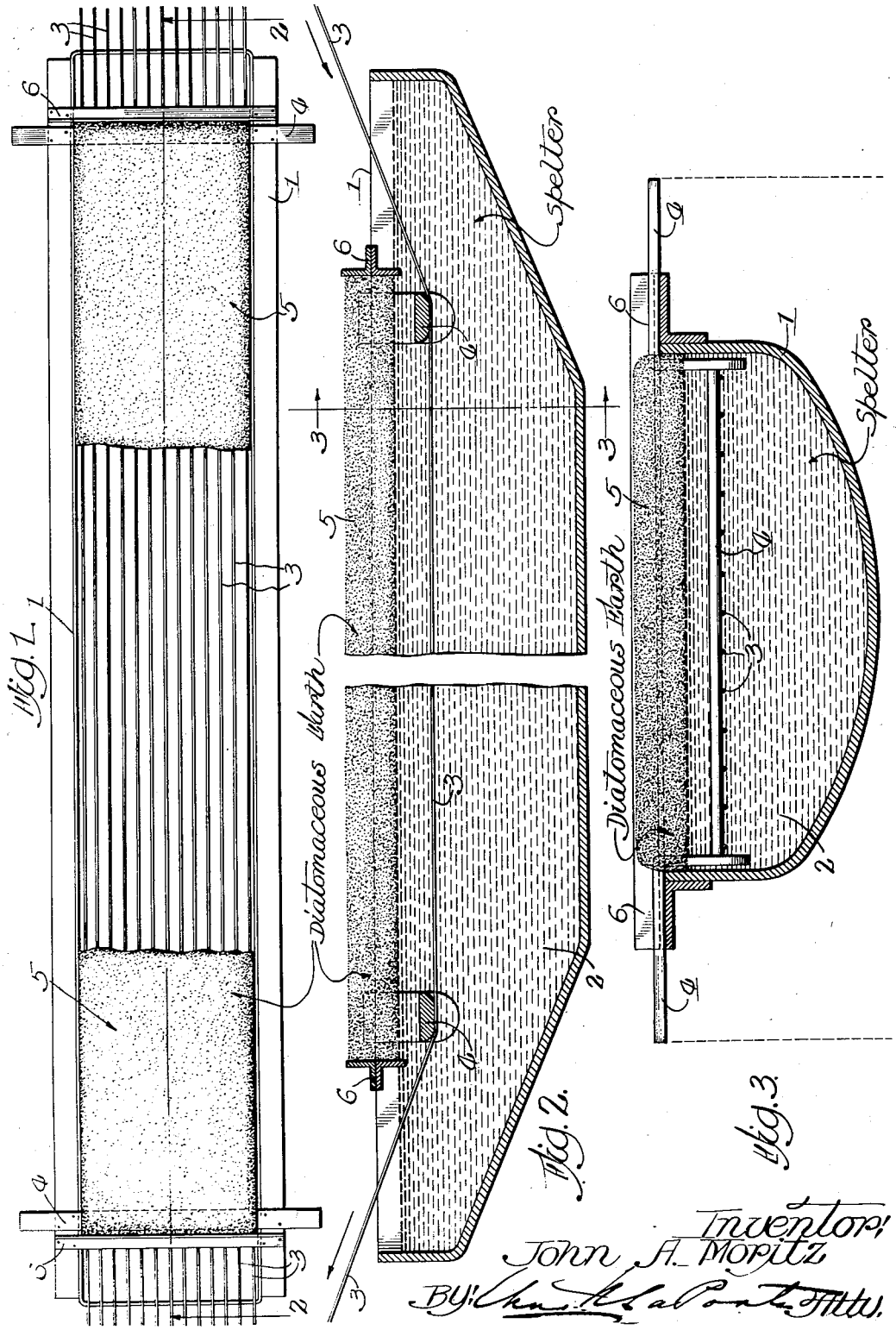

Patented Mar. 14, 1933

1,901,464

UNITED STATES PATENT OFFICE

JOHN A. MORITZ, OF CRAWFORDSVILLE, INDIANA

METHOD OF INSULATING ZINC SPELTER BATHS AND MEANS FOR EFFECTING THEIR PRACTICE

Application filed April 23, 1931. Serial No. 532,224.

This invention has reference to a new and improved method of reducing, if not entirely eliminating, the formation of oxides, ashes, skimmings and dross during the coating of metallic articles, as for example wire, with metal, as for example zinc spelter, and to the means for effectively practicing the invention.

In the art of annealing and galvanizing metallic articles, as for example iron or steel wire, use has been made of some insulating means for the molten metal surfaces in an attempt to prevent oxidization of the metal and to thereby reduce the production of ashes, oxides, skimmings and dross, with a view to a lesser consumption of fuel and to increase the life of the pans and furnaces and in general to reduce the cost of galvanizing and annealing, but as I view it with no great amount of success. In fact, I have experimented with different materials and devices but have never attained the results I have with the herein described material.

I have discovered, after many years of experience in the actual production of coated metallic articles, as for example in the coating of iron or steel wire with zinc spelter, a material which, for insulating purposes on the surface of the molten metal, possesses that quality of insulation which will effectively prevent oxidization of the metal and as the result of such prevention, effectively reduce the production of ashes, oxides or skimmings, reduce considerably the consumption of fuel and increase the life of the pans and furnaces and thereby reduce the maintenance cost of the pans and furnaces and in general save considerable in the process of galvanizing and annealing. The material which I employ is diatomaceous earth, preferably in pulverized state, known for its quality as a poor conductor of heat, and with its application as a surface covering for the molten metal a very effective insulator for producing the results herein enumerated, and when so employed as an insulator, changing atmospheric conditions at the pan containing the molten metal and thereby make working conditions for the men employed in these operations less arduous and more pleasant than has heretofore been the case with insulators with which I am familiar.

In the practice of applying the diatomaceous earth as an insulator to the molten metal surface, I provide means to confine the insulating material within an approximate given area on the surface of the metal, whereby to keep the insulating material from coming in contact with the article or articles entering and leaving the molten metal; and I further provide suitable sinkers or guides for insuring submergence of the article being coated, within the metal and below the insulating material.

That the invention may be more fully understood, reference is had to the accompanying drawing forming part of this application, illustrating a preferred embodiment of the invention, in which:—

Fig. 1 is a plan view of a zinc spelter pan with a showing of wires entering and leaving the pan and with an insulator of diatomaceous earth covering the greater portion of the surface of the molten metal, the insulating material and the metal being broken away to expose the wires;

Fig. 2 is a longitudinal sectional view through the pan, metal and insulating material disclosing the means for confining the insulating material, and the means for insuring submergence of the articles within the molten metal below the insulating material, and Fig. 3 is a cross-section as the same would appear if taken on the line 3—3, Fig. 2, looking in the direction of the arrows in said figure.

Like characters of reference denote corresponding parts throughout the figures.

In the drawing I have shown a zinc spelter pan 1, such as is now commonly used in wire mills for the zinc coating of iron or steel wires. The pan contains zinc spelter 2. Wires to be coated are designated 3 and are shown entering and leaving the pan and directed under sinkers or guides 4 which insures the wires as they pass through the molten metal being submerged in the zinc spelter and coated with the hot spelter during such travel.

The diatomaceous earth 5, employed as the insulating material, is laid on the surface of the molten metal in substantially the manner disclosed and is retained within defined limits lengthwise of the pan and molten metal by the cross pieces or members 6 which serve as retaining walls to dam the insulating material therebetween and prevent the insulating material from coming into contact with the wires at points where they enter and leave the molten metal in the pan which, if not prevented would result in producing rough and uneven coated surfaces on the materials coated.

The cross pieces or members 6 are supported by the side walls of the pan, as well as the walls of the furnace and likewise are the sinkers or guides 4 supported. The latter members, however, are so shaped or constructed as best seen in Fig. 3, that their guiding members are submerged within the molten metal so that the wires will pass thereunder and be submerged within the metal for approximately the entire length of the insulating material disposed thereabove on the surface of the metal. It being preferable to locate the sinkers or guides next adjacent the members 6 and within the dam formed thereby.

While I have elected to show the use of the diatomaceous earth in connection with the zinc coating of iron or steel wire and as an insulating material therefor to accomplish the results hereinbefore set forth, it is to be understood, of course, that the adaptation of such material, as an insulator may be found equally as effective in connection with other and various articles coated with zinc spelter.

What I claim is:—

1. The method of preventing oxidization and the formation of oxides, ashes, skimmings and dross during the coating of iron or steel materials with molten zinc spelter, which consists in covering the surface of a molten metal bath with diatomaceous earth, passing the materials to be coated through such metal bath beneath that covered with such earth, and confining the earth to a defined area so as to prevent the materials coming into contact with the earth on entering and leaving the metal bath.

2. The method of preventing oxidization and the formation of oxides, ashes, skimmings and dross during the coating of iron or steel materials with molten zinc spelter, which consists in covering the surface of a molten metal bath with diatomaceous earth, in a pulverized state, passing the materials to be coated through such metal bath beneath that covered with such earth, and confining the earth to a defined area so as to prevent the materials coming into contact with the earth on entering and leaving the metal bath.

JOHN A. MORITZ.